United States Patent
Shah et al.

(10) Patent No.: US 8,046,329 B2
(45) Date of Patent: Oct. 25, 2011

(54) INCREMENTAL BACKUP OF DATABASE FOR NON-ARCHIVE LOGGED SERVERS

(75) Inventors: Amrish Shah, Pune (IN); Udayan Majumdar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 573 days.

(21) Appl. No.: 12/164,753

(22) Filed: Jun. 30, 2008

(65) Prior Publication Data

US 2009/0327362 A1 Dec. 31, 2009

(51) Int. Cl.
*G06F 7/00* (2006.01)
*G06F 17/00* (2006.01)

(52) U.S. Cl. .......................... 707/624; 707/626; 707/646

(58) Field of Classification Search .................... None
See application file for complete search history.

(56) References Cited

U.S. PATENT DOCUMENTS

| | | | |
|---|---|---|---|
| 6,101,585 A | 8/2000 | Brown et al. | |
| 6,665,815 B1 | 12/2003 | Goldstein et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 6,981,177 B2 | 12/2005 | Beattie | |
| 7,310,654 B2 | 12/2007 | McNeil | |
| 2004/0268068 A1 | 12/2004 | Curran et al. | |
| 2006/0161802 A1* | 7/2006 | Wang et al. | 714/4 |
| 2006/0218204 A1* | 9/2006 | Ofer et al. | 707/201 |
| 2006/0242211 A1* | 10/2006 | Becker et al. | 707/204 |
| 2007/0174325 A1* | 7/2007 | Mooney et al. | 707/102 |
| 2008/0244204 A1* | 10/2008 | Cremelie et al. | 711/162 |
| 2008/0263109 A1* | 10/2008 | Patterson | 707/204 |
| 2010/0122324 A1* | 5/2010 | Welingkar et al. | 726/5 |

* cited by examiner

*Primary Examiner* — Alicia M Lewis (74) *Attorney, Agent, or Firm* — Rory D. Rankin; Meyertons, Hood, Kivlin, Kowert & Goetzel, P.C.

(57) ABSTRACT

Systems and methods for computer system data backup. A computer system includes an application server operating on a first host and a backup application configured to create new target database images for a sequence of backup datasets. The backup datasets include data from source databases associated with the application server. At least one of the source databases is hosted on a remote source host separate from the first host. The computer system includes a client registered with the application server and installed on a backup host. The client stores a seed document in each of the new target database images and modifies each seed document to specify which portions of a backup dataset in the sequence are to be stored in each new target database image. The backup application updates each new target database image based on the contents of a seed document.

14 Claims, 7 Drawing Sheets

INCREMENTAL BACKUP OF DATABASE FOR NON-ARCHIVE LOGGED SERVERS

BACKGROUND OF THE INVENTION

1. Field of the Invention

This invention relates to computer systems and, more particularly, to backup and restoration of data within computer systems.

2. Description of the Related Art

There is an increasing need for organizations to protect data that is associated with a variety of applications via some type of backup mechanism. For example, popular email and collaboration servers such as Microsoft Exchange® and IBM® Lotus® Domino® have associated data that may be critical to an organization's operation. Data associated with these servers may be stored in one or more databases along with application-specific metadata. One approach to protecting data associated with these servers is to save an image of the database. Such an approach may be less than satisfactory because the data's associated application may not be able to readily recognize the saved image and associated metadata needed to properly access the data from within the application. It is often necessary to backup metadata that captures the context of the data as well as the data itself. In addition, it may be necessary to store the data context in order to enable restoration of selected portions of an application's data. Such restorations may be referred to as granular recovery.

Generally speaking, application servers provide various backup facilities such as APIs through which to backup data and associated metadata. Unfortunately, the capabilities of these APIs and similar mechanisms may be limited. For example, the Domino® server product provides a backup API that can be called locally by a backup agent in order to backup data and metadata stored in the server's Notes Storage Facility (NSF) format. The Domino® server product requires that the agent be installed on the same host as the application server and its local NSF database. However, the Domino® product also allows data to be stored remotely in other databases, such as in a remote installation of IBM's database management system DB2, also know as NSFDB2. Unfortunately, to use the backup APIs for these remote databases, additional agents must be installed on each remote host. Making a backup of such complex configurations involves obtaining authority to access the backup APIs in multiple locations as well as coordination among multiple backup agents.

In addition to the above considerations, additional limitations may be imposed when an incremental backup is attempted. In order to produce an incremental backup, backup applications may require that the targeted application server be configured to perform archive logging in order to provide the information needed to determine what data qualifies for a given incremental backup. Unfortunately, archive logging may cause poor performance. As a result, archive logging may be unsuitable for various applications.

In view of the above, an effective system and method for allowing both full and incremental backups and granular recovery to be performed on both local and remote databases is desired.

SUMMARY OF THE INVENTION

Various embodiments of a computer system and methods are disclosed. In one embodiment, a computer system includes an application server operating on a first host and a backup application configured to create new target database images for each of a sequence of backup datasets. The backup datasets include data from source databases associated with the application server. At least one of the source databases is hosted on a remote source host separate from the first host. The computer system further includes a client registered with the application server and installed on a backup host. The client stores a seed document in each of the new target database images and modifies each seed document to specify which portions of a backup dataset in the sequence are to be stored in each corresponding new target database image. The backup application updates each new target database image based on the contents of each corresponding seed document.

In a further embodiment, the backup application creates separately stored new target database images for each backup dataset of the sequence. At least one new target database image is created on a target host that is remote from the application server. In a further embodiment, updating each new target database does not require a backup agent to be installed on the remote source host. In a still further embodiment, archive logging is not enabled on the application server.

In a still further embodiment, modifying a seed document includes the client storing information in the seed document specifying data included in a previous backup dataset of the sequence. In a still further embodiment, updating each new target database image includes the backup server synchronizing the new target database images with data from the source databases excluding a least a portion of the data specified in the information used to modify the seed document. In a still further embodiment, at least one of the seed documents is configured to pull at least a portion of a backup dataset into the target database image.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
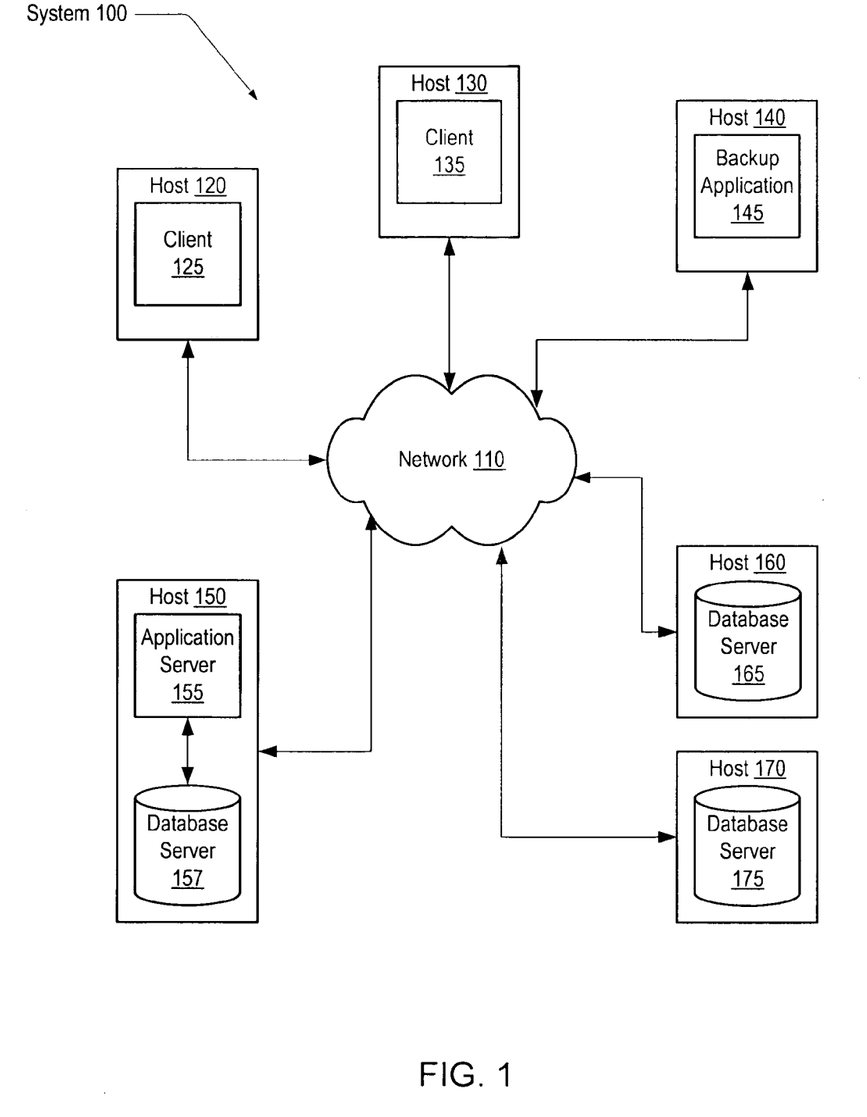
FIG. 1 is a generalized hardware block diagram of one embodiment of a computer system.

FIG. 1 is a generalized hardware block diagram of one embodiment of a computer system 100. As shown, system 100 includes a network 110 interconnecting hosts 120, 130, 140, 150, 160, and 170. Network 110 may be the Internet, an intranet, a local area network (LAN), a wide area network (WAN), or some other suitable network for interconnecting computer systems. Each of hosts 120, 130, 140, 150, 160, and 170 may be a computer system that includes one or more operating systems that support various software application programs such as databases, application servers, web servers, office productivity tools, and various other client or server programs.

In the illustrated embodiment, host 150 hosts an application server 155 coupled to a database server 157. Hosts 160 and 170 host database servers 165 and 175, respectively. Hosts 120 and 130 host clients 125 and 135, respectively. Host 140 hosts a backup application 145. Clients 125 and 135 may be clients of application server 155. Application server 155 may store its data and associated metadata in databases on database servers 157, 165, and 175. Backup application 145 may be configured to perform backups of the data and metadata associated with application server 155 as described in greater detail below.

As used herein, an application server may be any of a variety of servers that an enterprise may use to facilitate communication among clients, such as email servers and collaboration servers. Typically, these types of application servers have large amounts of data in the form of messages, notes, and other documents that are stored in a database along with metadata that establishes the context in which the data is used by the application. In particular, the examples that follow generally correspond to an IBM® Lotus® Domino® server for illustration purposes, although one of ordinary skill will appreciate that other application servers may take advantage of the backup features and functions that are described herein.

System 100 is illustrative of a wide variety of computer system topologies. In alternative embodiments, application server 155, backup application 145, one or more databases, and one or more clients may be hosted by more or fewer than the illustrated number hosts, or, in one embodiment, a single host. Any of hosts 120, 130, 140, 150, 160, and 170 may be coupled to network 110 through a firewall (not shown) for security purposes. These and other variations will be apparent to one of ordinary skill in the art.

Figure 2:
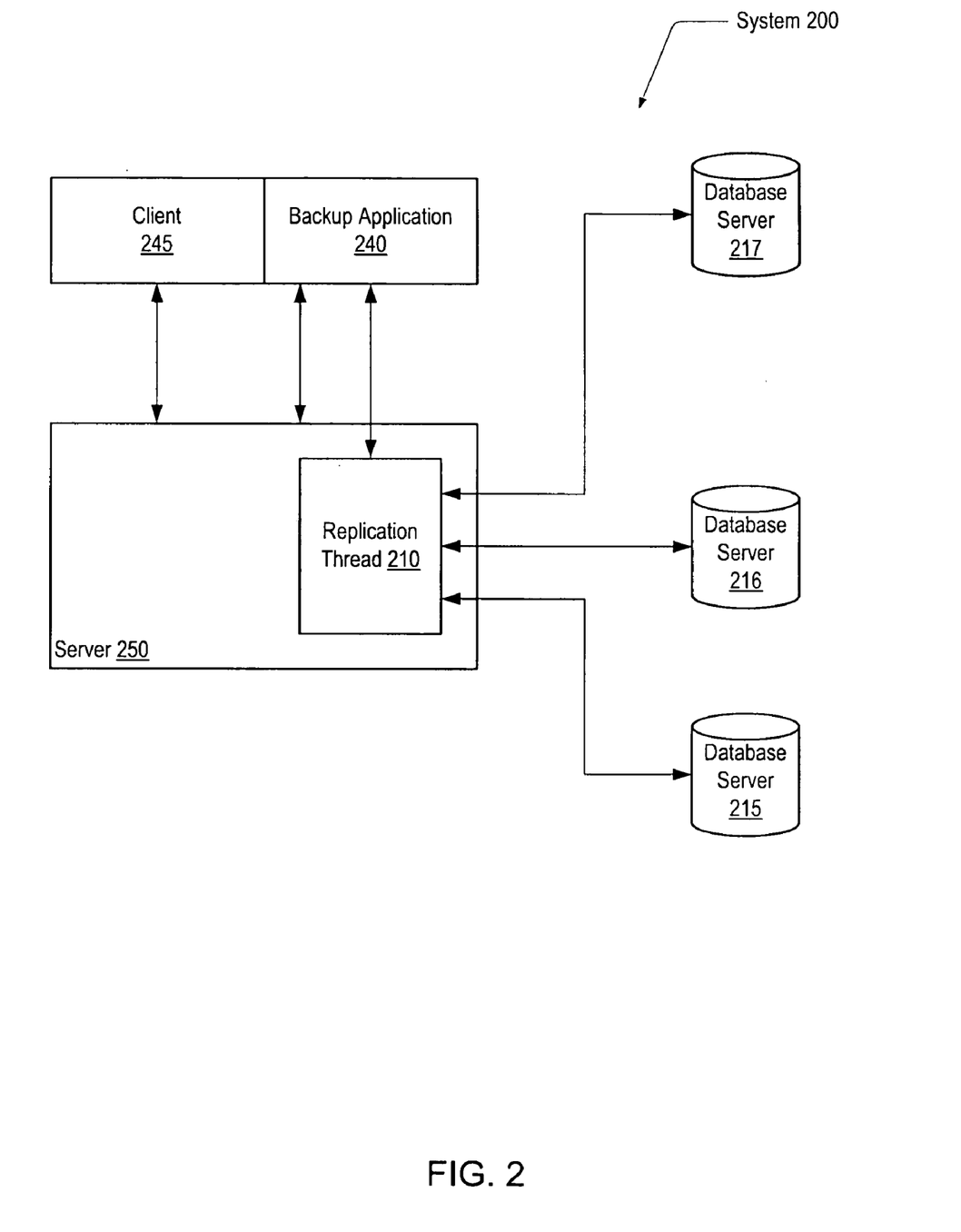
FIG. 2 illustrates one embodiment of a software component system that may operate within a computer system.

Turning now to FIG. 2, one embodiment of software component system 200 that may operate within a computer system is shown. For ease of discussion, particular examples may be used (e.g., the Domino server or Notes client may be used in the discussion). However, it is to be understood that the methods and mechanisms described herein are not limited to such examples. Those skilled in the art will appreciate the methods and mechanisms described herein may be applied to any number of suitable systems. System 200 illustrates one embodiment of software components that may operate within computer system 100. In the illustrated embodiment, system 200 includes a client 245, a backup application 240, a server 250, and database servers 215, 216, and 217. In one embodiment, client 245 is a Notes client of server 250, which is a Domino server. Client 245 is also associated with a backup application 240. For example, in one embodiment, client 245 and backup application 240 may operate on a single host. Server 250 includes a replication thread 210 that may be coupled to database servers 215, 216, and 217. In one embodiment, database server 215 may be a local database server for server 250, that is, database server 215 may be hosted on the same host as server 250. Database server 216 may be a remote database server for server 250. Database server 217 may be a backup database server associated with backup application 240 on which databases from database servers 215 and 216 may be replicated.

During operation, server 250 may store data in one or more database images using a server-specific file format. For example, if server 250 is a Domino server, the file format may be referred to as NSF (Notes Storage Facility). NSF files may be designated with a '.nsf' file extension. Server 250 may be configured to launch a special task that is responsible for synchronization of files in both local and remote database images. This task may be referred to as a replication thread, for instance, replication thread 210. Generally speaking, replication is a capability provided by an application server for synchronizing multiple database images. Replication alone performs synchronization by overwriting the contents of a target image with data from a source image. Consequently, after several iterations of synchronization, the state of previous images may be lost. A replication thread may be configured to operate through any TCP/IP port. In one embodiment, replication threads operate on port 1352 by default. A replication operation may be initiated by an administrator or a process that is either local to or remote from server 250. In one embodiment, remote initiation may require a remote user to be registered on server 250 with proper access control permissions. For example, a remote client may request registration with a server. In one embodiment, the remote client and a backup application may be hosted on the same host. In response to a registration request, server 250 may send credentials to client 245. In a Notes/Domino client/server embodiment, the credentials may be in the form of an .id file sent to the requesting Notes client. Once client 245 is registered, it may launch replication operations. In some embodiments, server 250 and client 245 may be separated by a firewall. To allow replication requests to pass through the firewall, server 250 may configure replication thread 210 to listen for replication requests on a specific port only. In one embodiment, replication thread 210 may require that the backup database store data in a disk-based backup database image in the server-specific format, such as .nsf format. In one embodiment, replication requests may use a protocol that is configurable to use a specific TCP/IP port (e.g., in a Domino/Notes embodiment a Notes Remote Procedure Call (NRPC) may be used). If client 245 and server 250 are separated by a firewall, the specific port configured for NRPC communications may be open to permit communication through the firewall.

Figure 3:
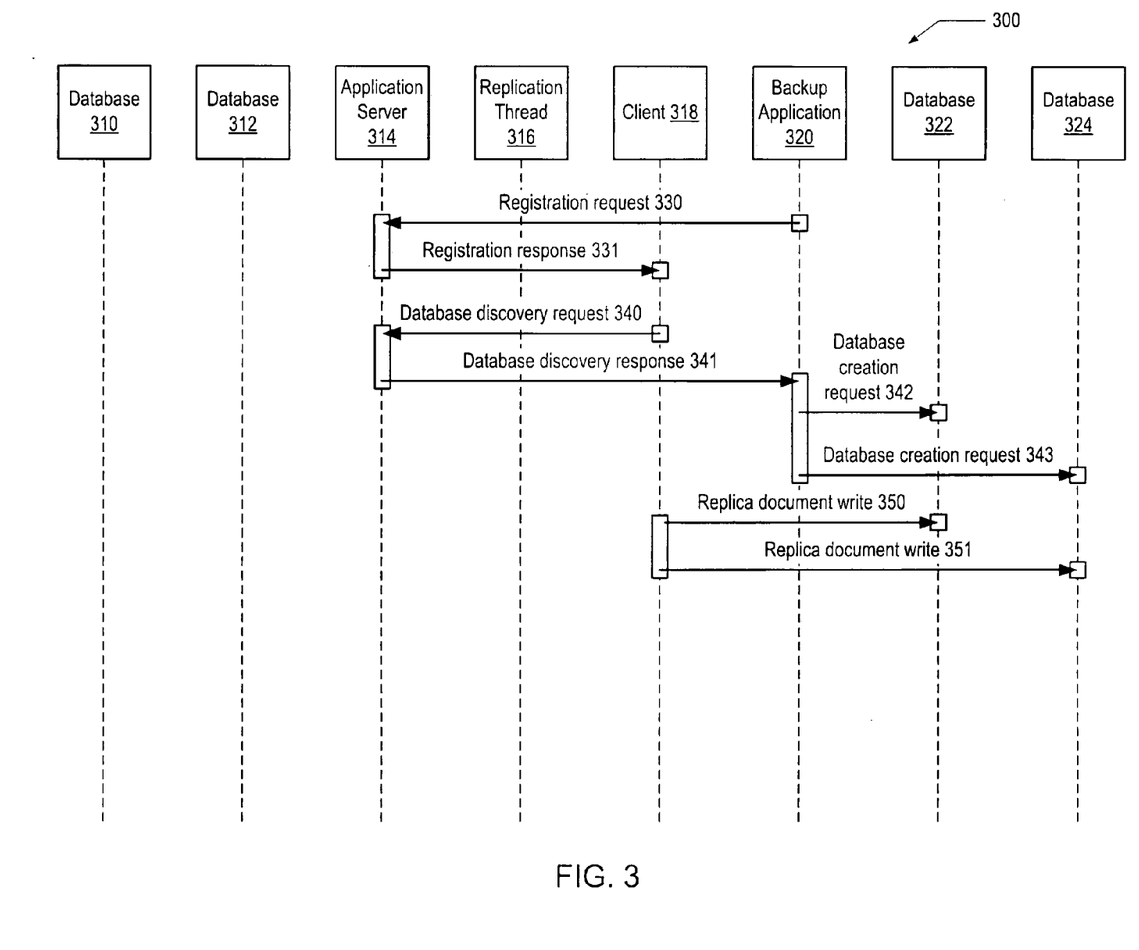
FIG. 3 is a sequence diagram illustrating one embodiment of a setup operation that may be used in preparation for performing a backup of data associated with an application server.

FIG. 3 is a sequence diagram 300 illustrating one embodiment of a setup operation that may be used in preparation for performing a backup of data associated with an application server. The actors shown in sequence diagram 300 are databases 310, 312, 322, and 324, application server 314, replication thread 316, client 318, and backup application 320. The actors shown in sequence diagram 300 generally correspond to the components illustrated in FIG. 2 and may be hosted in a computer system such as the system shown in FIG. 1. Databases 310 and 312 may be source databases and databases 322 and 324 may be target database images that serve as backup stores for the data of databases 310 and 312. More particularly, database 310 may be a local database stored in database server 215, database 312 may be a remote database stored in database server 216, and databases 322 and 324 may be backup database images stored in database server 217.

A setup operation may begin with backup application 320 sending a registration request 330 to application server 314. Application server 314 may respond to the registration request by sending response 331 to the host from which the request was sent, configuring a connection to client 318. In one embodiment, response 331 may include a .id file that holds credentials for client 318. Next, client 318 may send a database discovery request 340 to application server 314 in order to collect information regarding all of the databases that are associated therewith. In one embodiment in which server 314 is a Domino server, database discovery request 340 may open a database named dbdirman.nsf to find the desired information. Database dbdirman.nsf, or a similar database in an alternative embodiment, maintains information about the databases used by the (e.g., Domino) server. In an alternative embodiment, database discovery request 340 may call an API provided by the Domino server, 'NSFSearch,' to find the desired information. Information describing the databases used by the application server 314 may be returned to backup application 320 in database discovery response 341. Once backup application 320 has identified the databases used by the application server, an empty target replica database image may be created for each one. For example, in the illustrated embodiment, backup application 320 may send database creation request 342 to a database server to create a target database image 322 and database creation request 343 to a database server to create a target database image 324. Database images 322 and 324 may be in the same database server or in different database servers. Once database images 322 and 324 have been created, client 318 may send replica document write requests 350 and 351 to database images 322 and 324, respectively to write seed documents in the database images. In one embodiment in which server 314 is a Domino server, the seed documents written by write requests 350 and 351 may be Lotus replication notes. Each of writes 350 and 351 may include various additional items to be stored in the newly created database images. For example, an access control list (ACL) and any non-data documents associated with the databases used by server 314 may be stored in each target database image. In an embodiment in which server 314 is a Domino server, backup application 320 may obtain these items from server 314 by calling an 'NSFNoteCopy' API. In one embodiment, the seed documents that are created in the target database images may be used during a replication to pull data from the source databases. In an alternative embodiment, the notes in database images 322 and 324 may be used as targets for data pushed from server 314.

Figure 4:
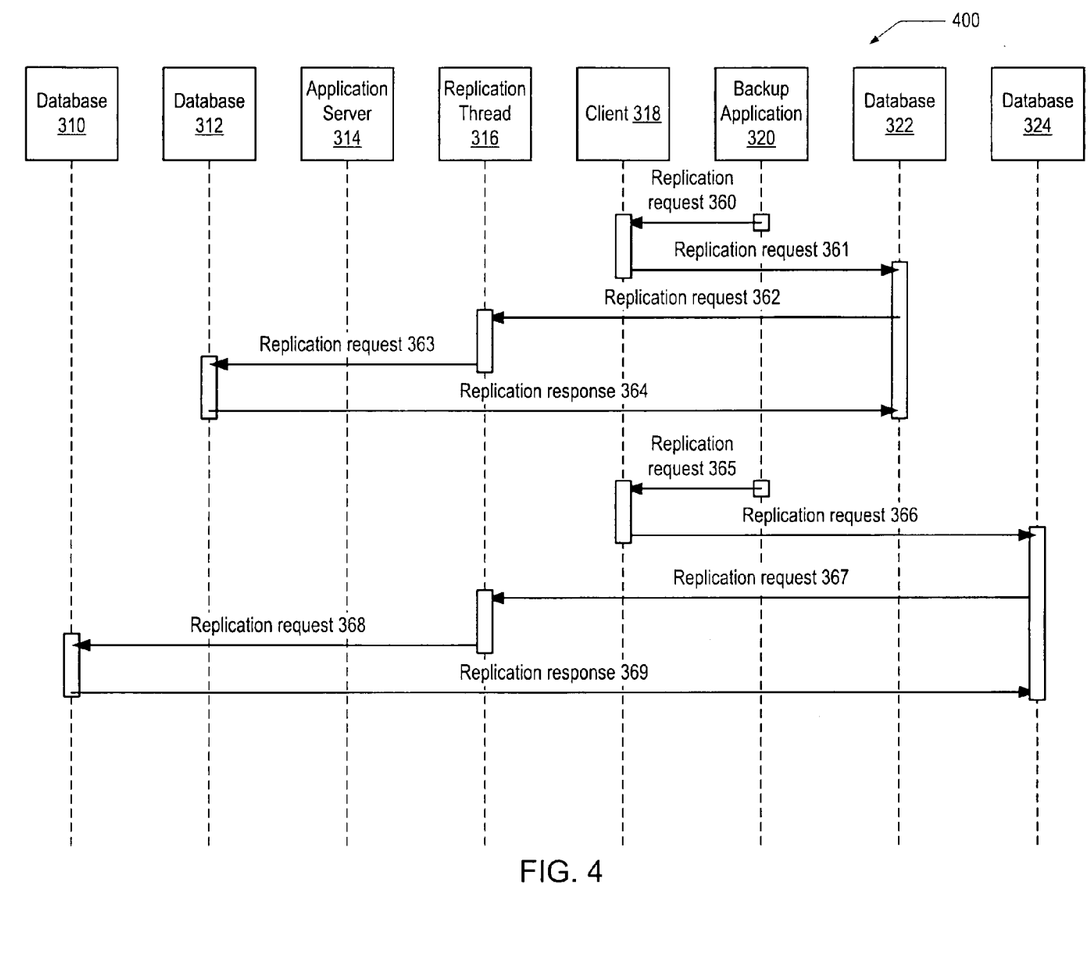
FIG. 4 is a sequence diagram illustrating one embodiment of a process that may be used to perform a full backup of data associated with an application server.

FIG. 4 is a sequence diagram 400 illustrating one embodiment of a process that may be used to perform a full backup of data associated with an application server. The actors shown in sequence diagram 400 are the same as the actors shown in sequence diagram 300. A full backup operation may begin with backup application 320 sending a replication request to client 318 for each database image that is to be a replication target. For example, backup application 320 may send replication requests 360 and 365 corresponding to database images 322 and 324, respectively, to client 318. Client 318 may respond by sending a corresponding replication request to a replication seed document in each database image that is to be a replication target. For example, client 318 may send replication request 361 to database image 322 and replication request 366 to database image 324. As noted above, in an embodiment in which server 314 is a Domino server, the replication seed documents may be Lotus replication notes. Each of replication requests 361 and 365 may change a setting in the respective target replication seed document to cause it to replicate all documents in the corresponding source database. For example, in one embodiment, the setting change to the replication seed document stored in database image 322 may cause replication request 362 to be sent to replication thread 316. In response, replication thread 316 may send replication request 363 to the corresponding database image 312. Database image 312 may then send replication response 364 to database image 322 including the data to be replicated. In addition, the setting change to the replication seed document stored in database image 324 may cause replication request 367 to be sent to replication thread 316. In response, replication thread 316 may send replication request 368 to the corresponding database 310. Database 310 may then send replication response 369 to database image 324 including the data to be replicated. Data received in replication responses 364 and 369 may include metadata enabling the context of the associated data to be backed up and also permitting granular restoration of the associated data.

Figure 5:
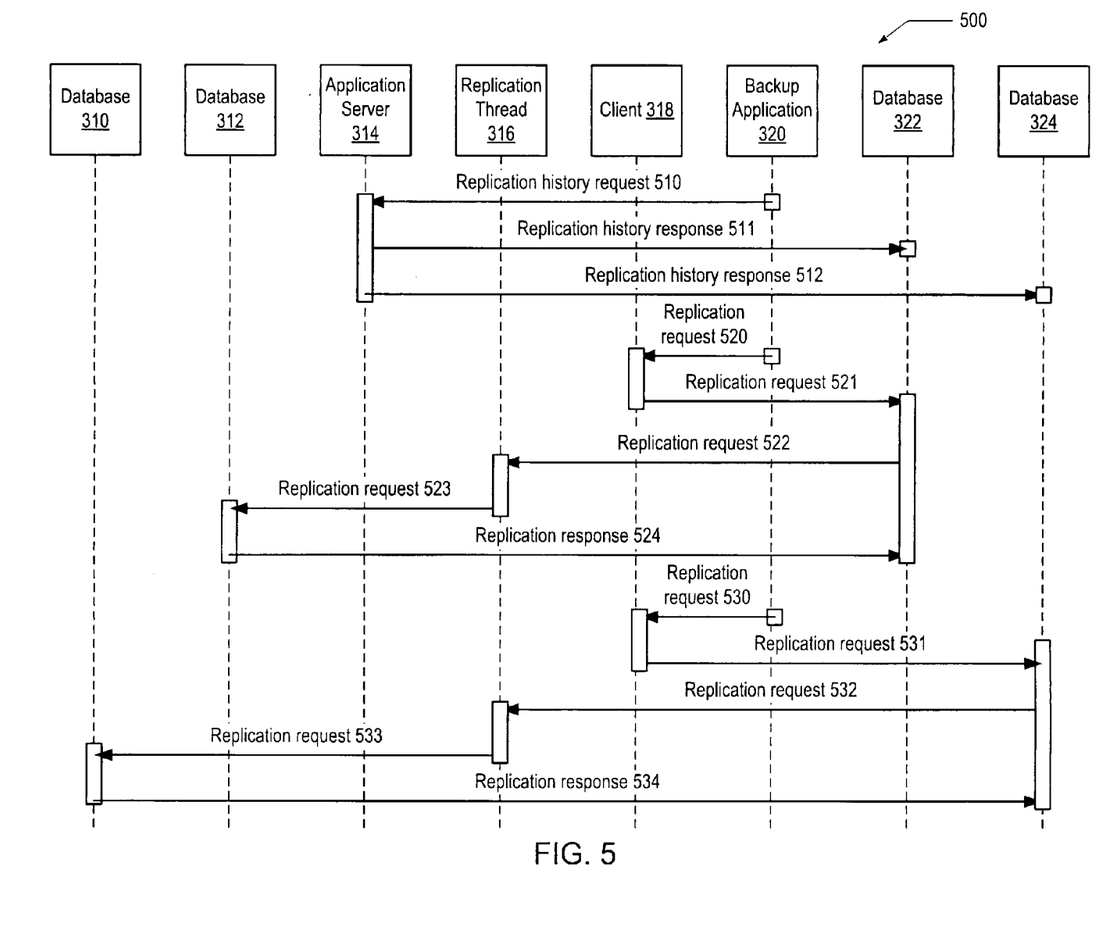
FIG. 5 is a sequence diagram illustrating one embodiment of a process that may be used to perform an incremental backup of data associated with an application server.

FIG. 5 is a sequence diagram 500 illustrating one embodiment of a process that may be used to perform an incremental backup of data associated with an application server. The actors shown in sequence diagram 500 are the same as the actors shown in sequence diagram 300. An incremental backup operation may begin with backup application 320 sending a replication history request 510 to server 314. In response, server 314 may send a replication history response 511 to database image 322 and a replication history response 512 to database image 324. Each of replication history responses 511 and 512 may include a summary of the data that has previously been replicated to database images 322 and 324, respectively. After the replication histories have been sent to the backup target database images, backup application 320 may send a replication request to client 318 for each database image that is to be a replication target. For example, backup application 320 may send replication requests 520 and 530 corresponding to database images 322 and 324, respectively, to client 318. Replication requests 520 and 530 may determine the data to be replicated based on information in history responses 511 and 512, respectively. Each of replication requests 520 and 530 may include a formula that specifies what data is to be replicated. For example, a formula may specify that any document that has changed since a particular point in time should be included in an incremental backup.

A variety of other formulas are possible and are contemplated. For instance, a formula may specify that documents changed by a particular person, or that have not been subsequently deleted should be included. Client 318 may respond by sending a corresponding replication request and formula to a replication seed document in each database image that is to be a replication target. For example, client 318 may send replication request 521 to database image 322 and replication request 531 to database image 324. Each of replication requests 521 and 531 may change a setting in the respective target replication seed document to cause it to replicate the data specified in the corresponding source database. For example, in one embodiment, the setting change to the replication seed document stored in database image 322 may cause replication request 522 to be sent to replication thread 316. In response, replication thread 316 may send replication request 523 to the corresponding database 312. Database 312 may then send replication response 524 to database image 322 including the data to be replicated. In addition, the setting change to the replication seed document stored in database image 324 may cause replication request 532 to be sent to replication thread 316. In response, replication thread 316 may send replication request 533 to the corresponding database 310. Database 310 may then send replication response 534 to database image 324 including the data to be replicated. Data received in replication responses 524 and 534 may include metadata enabling the context of the associated data to be backed up and also permitting granular restoration of the associated data.

It is noted that for an incremental backup, each replication request may include formula information specifying the data to be included. In one embodiment in which server 314 is a Domino server, formula information may be specified in Lotus Notes formula language. Formula information within each replication request may cause replication of a subset of the data associated with a server. Such replication may be referred to as selective replication.

Figure 6:
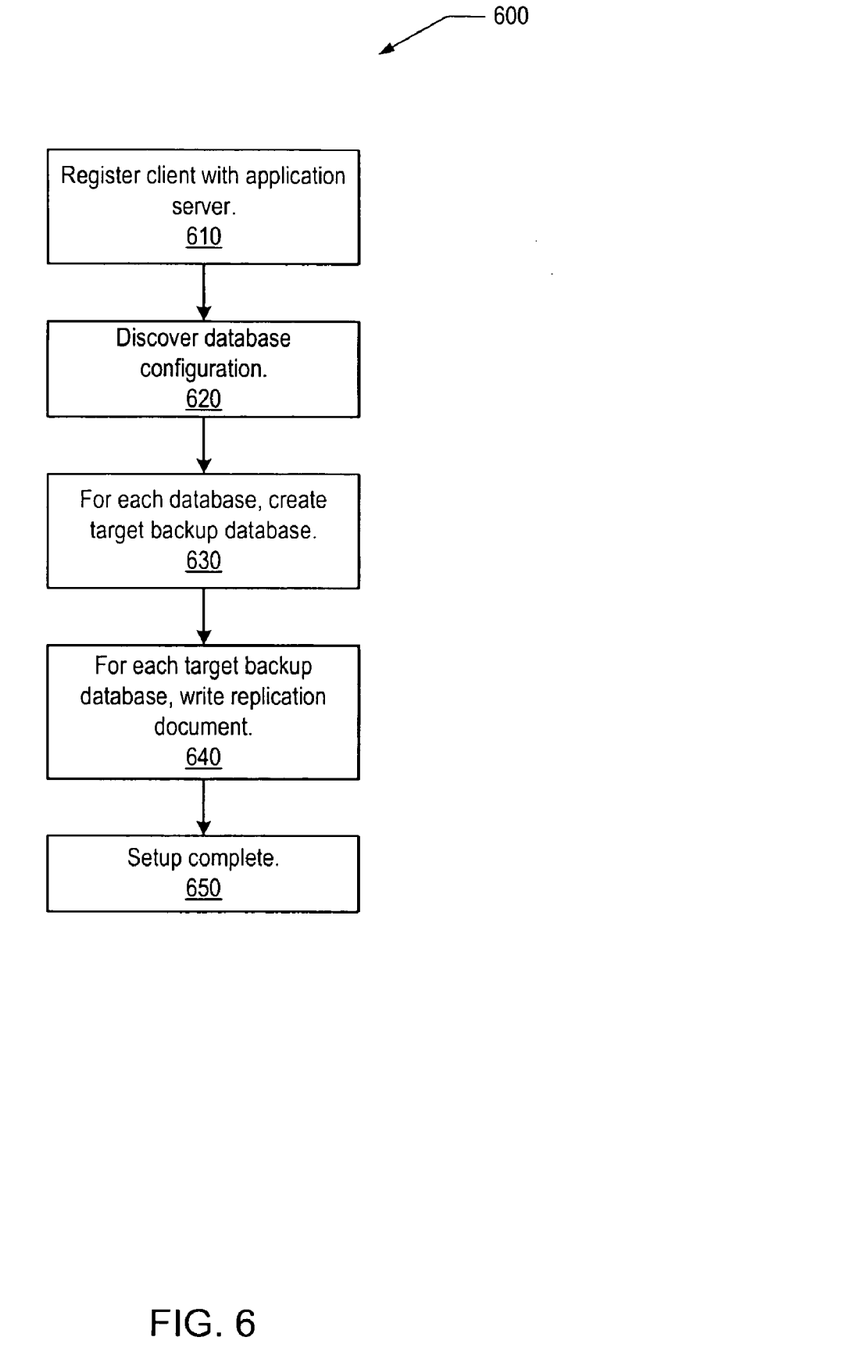
FIG. 6 illustrates one embodiment of a process that may be used to setup a backup operation of data associated with an application server.

FIG. 6 illustrates one embodiment of a process 600 that may be used to setup a backup operation of data associated with an application server. Process 600 may begin with a client registering with its corresponding server (block 610). For example, in one embodiment, a Lotus notes client may send a registration request to a Domino server and receive a response including a .id file that holds credentials for the client. Once the client has been registered and possesses valid credentials to communicate with the server, the client may query the server to discover the configuration of databases that are associated with the server (block 620). For each database that is discovered, a target backup database image may then be created (block 630). The client may then write a replication seed document in each newly created target database image (block 640). In addition, an access control list (ACL) and any non-data documents associated with the databases used by the application server may be stored in each target database image. Each replication seed document may be configured individually to either pull data from its corresponding database or have data from its corresponding database pushed to it during replication. Once a replication seed document has been created for each target backup database image, setup is complete (block 650).

Figure 7:
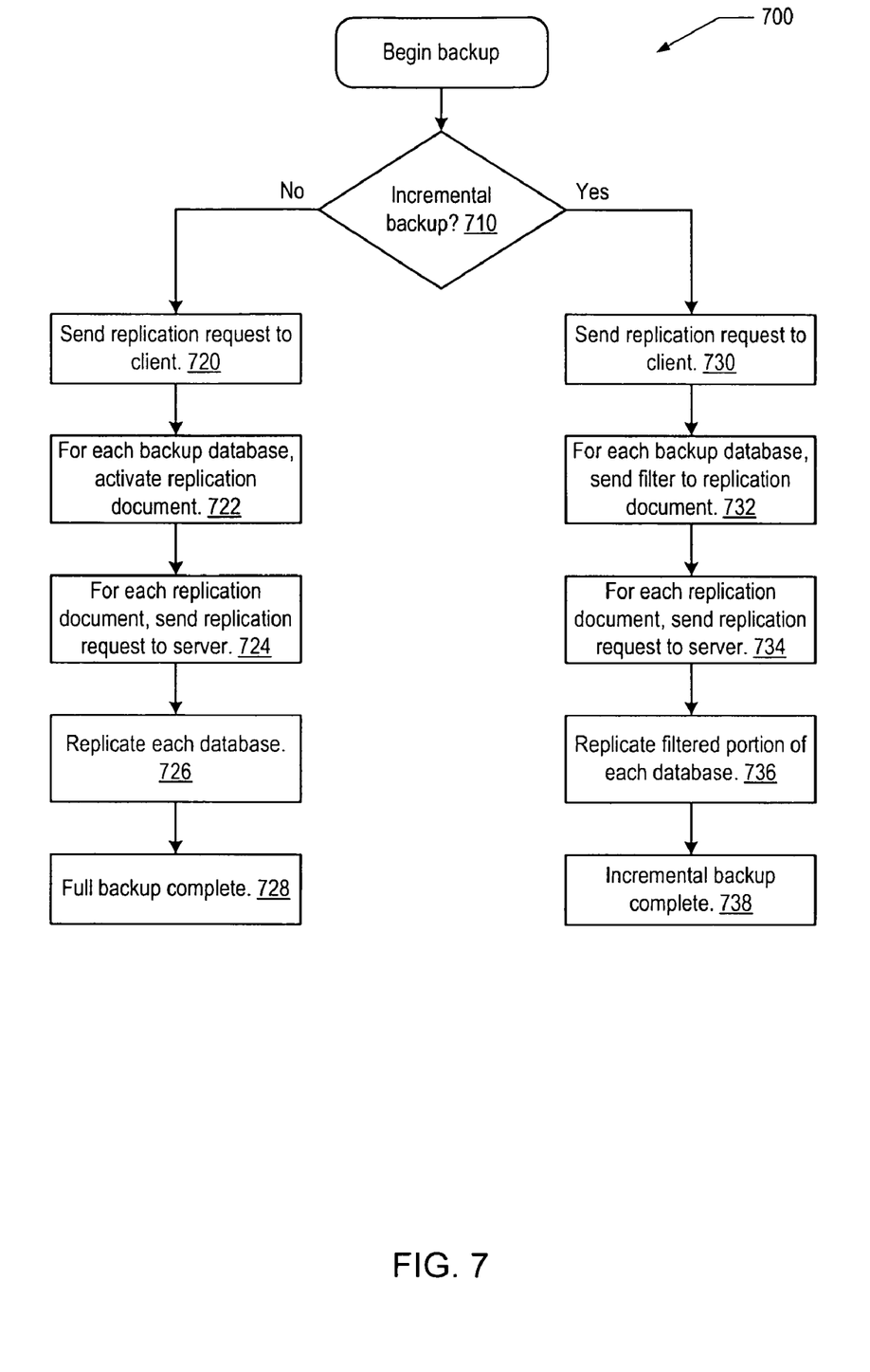
FIG. 7 illustrates one embodiment of a process that may be used to backup data associated with an application server.

FIG. 7 illustrates one embodiment of a process 700 that may be used to backup data associated with an application server. Process 700 may begin with a determination of whether a full or an incremental backup is desired (decision block 710). If a full backup is desired, a backup application may send a replication request to a client (block 720). In response to receiving the replication request, the client may activate a replication seed document in each backup database image that has been configured for replication (block 722). Each replication seed document that has been activated may then send a replication request to the corresponding server (block 724). The server may respond by replicating each database for which a replication request was received (block 726), completing a full backup (block 728).

If an incremental backup is desired, a backup application may send a replication request to a client (block 730). In response to receiving the replication request, the client may activate a replication seed document in each backup database image that has been configured for replication by sending a filter to it (block 732). Each replication seed document that has been activated may then send a selective replication request to the corresponding server based on the parameters of the filter (block 734). The server may respond by replicating a filtered portion of each database for which a replication request was received (block 736), completing an incremental backup (block 738).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for backup of one or more source databases associated with an application server operating on a first host, wherein at least one of the one or more source databases is hosted on a remote source host separate from the first host, the method comprising:
    creating one or more new target database images for each of a group of backup datasets, wherein the backup datasets include data from the one or more source databases;
    registering a client with the application server, wherein the client is installed on a backup host, the client storing a seed document in each of the one or more new target database images wherein said seed documents are Lotus® replication notes and said replication request is a Lotus® replication request;
    modifying each seed document to specify which portions of a backup dataset in said group are to be stored in each corresponding new target database image; and
    receiving a backup request;
    in response to determining the backup request corresponds to an incremental backup request:
    sending a replication request to said client, the replication request including a formula that indicates which data should be replicated;
    the client activating each seed document in said one or more new target database images, wherein said activating comprises conveying a filter to each said seed document;
    utilizing each said seed document to send a selective replication request based upon parameters of the filter to a given server responsive to the seed document being activated; and
    the given server replicating a filtered portion of each database for which a replication request is received, thereby updating said one or more new target database images, wherein archive logging is not used for replication.

2. The method of claim 1, further comprising creating separately stored new target database images for each backup dataset of the group, wherein at least one of said one or more new target database images is created on a target host that is remote from the application server.

3. The method of claim 1, wherein modifying a seed document comprises storing information in the seed document specifying data included in a previous backup dataset of the group.

4. The method of claim 1, wherein said updating comprises synchronizing the new target database images with data from the source databases excluding at least a portion of the data specified in the information used to modify the seed document.

5. The method of claim 1, wherein at least one of the seed documents is configured to pull at least a portion of a backup dataset into the target database image.

6. A computer system comprising:
    an application server operating on a first host;
    a backup application configured to create one or more new target database images for each of a group of backup datasets, wherein the backup datasets include data from one or more source databases associated with the application server, wherein at least one of the one or more source databases is hosted on a remote source host separate from the first host; and a client registered with the application server and installed on a backup host, wherein the client is configured to:
store a seed document in each of the one or more new target database images, wherein said seed documents are Lotus® replication notes and said replication request is a Lotus® replication request; and
modify each seed document to specify which portions of a backup dataset in said group are to be stored in each corresponding new target database image;

wherein the backup application receives a backup request;

wherein in response to determining the backup request corresponds to an incremental backup request:
the backup application is configured to send a replication request to said client, the replication request including a formula that indicates which data should be replicated;
the client is configured to activate each seed document in said one or more new target database images, wherein to activate each seed document the client conveys a filter to each said seed document;
utilize each said seed document to send a replication request based upon parameters of the filter to a given server responsive to the seed document being activated; and
the given server is configured to replicate a filtered portion of each database for which a replication request is received, thereby updating said one or more new target database images, wherein archive logging is not used for replication.

7. The system as recited in claim 6, wherein the backup application is further configured to creating separately stored new target database images for each backup dataset of the group, wherein at least one of said one or more new target database images is created on a target host that is remote from the application server.

8. The system of claim 6, wherein to modify a seed document includes the client storing information in the seed document specifying data included in a previous backup dataset of the group.

9. The system of claim 6, wherein to update each new target database image includes the backup server synchronizing the new target database images with data from the source databases excluding at least a portion of the data specified in the information used to modify the seed document.

10. The system of claim 6, wherein at least one of the seed documents is configured to pull at least a portion of a backup dataset into the target database image.

11. A computer readable medium storing computer instructions that are executable by a processor to:
create one or more new target database images for each of a group of backup datasets, wherein the backup datasets include data from one or more source databases associated with an application server operating on a first host, wherein at least one of the one or more source databases is hosted on a remote source host separate from the first host;
register a client with the application server, wherein the client is installed on a backup host and is configured to:
store a seed document in each of the one or more new target database images, wherein said seed documents are Lotus® replication notes and said replication request is a Lotus® replication request; and
modify each seed document to specify which portions of a backup dataset in said group are to be stored in each corresponding new target database image;
receive a backup request;
in response to determining the backup request corresponds to an incremental backup request:
sending a replication request to said client, the replication request including a formula that indicates which data should be replicated;
the client activating each seed document in said one or more new target database images, wherein said activating comprises conveying a filter to each said seed document;
each said seed document sending a selective replication request based upon parameters of the filter to a given server responsive to the seed document being activated; and
the given server replicating a filtered portion of each database for which a replication request is received, thereby updating said one or more new target database images, wherein archive logging is not used for replication.

12. The computer readable medium as recited in claim 11, wherein the instructions are further executable by a processor to create separately stored new target database images for each backup dataset of the group, wherein at least one of said one or more new target database images is created on a target host that is remote from the application server.

13. The computer readable medium of claim 11, wherein to modify a seed document includes the client storing information in the seed document specifying data included in a previous backup dataset of the group.

14. The computer readable medium of claim 11, wherein to update each new target database image, the instructions are further executable by a processor to synchronize the new target database images with data from the source databases excluding at least a portion of the data specified in the information used to modify the seed document.

* * * * *